COMPATIBLE COLOR PHOTOPHONE
Filed June 13, 1966 
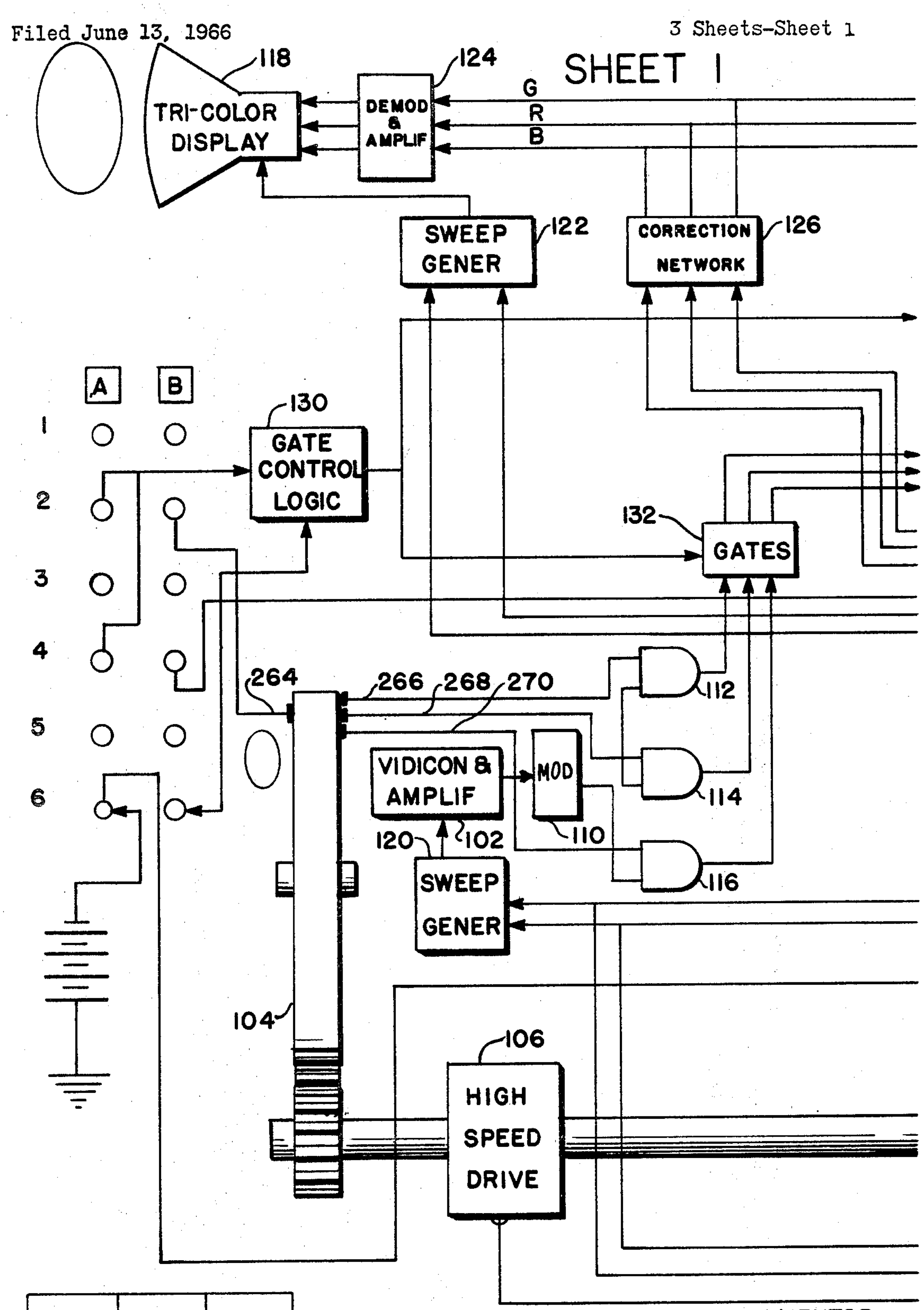
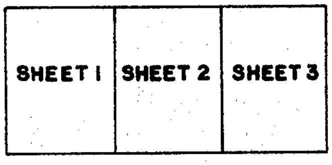
INVENTOR
John F. Brinster
Jack Larsen
ATTORNEY Aug. 11, 1970 J. F. BRINSTER 3,524,010
COMPATIBLE COLOR PHOTOPHONE
Filed June 13, 1966 3 Sheets-Sheet 2
SHEET 2
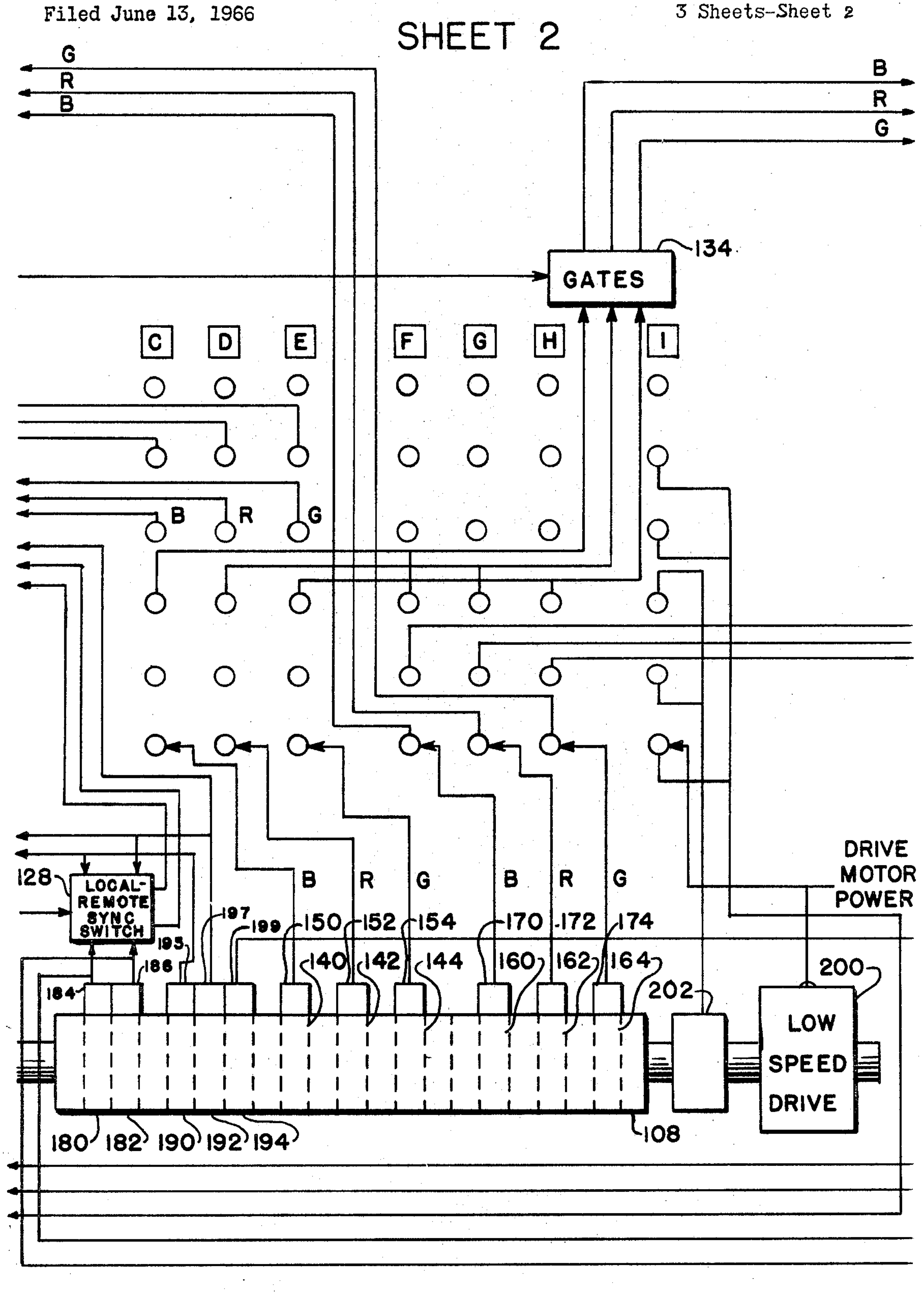

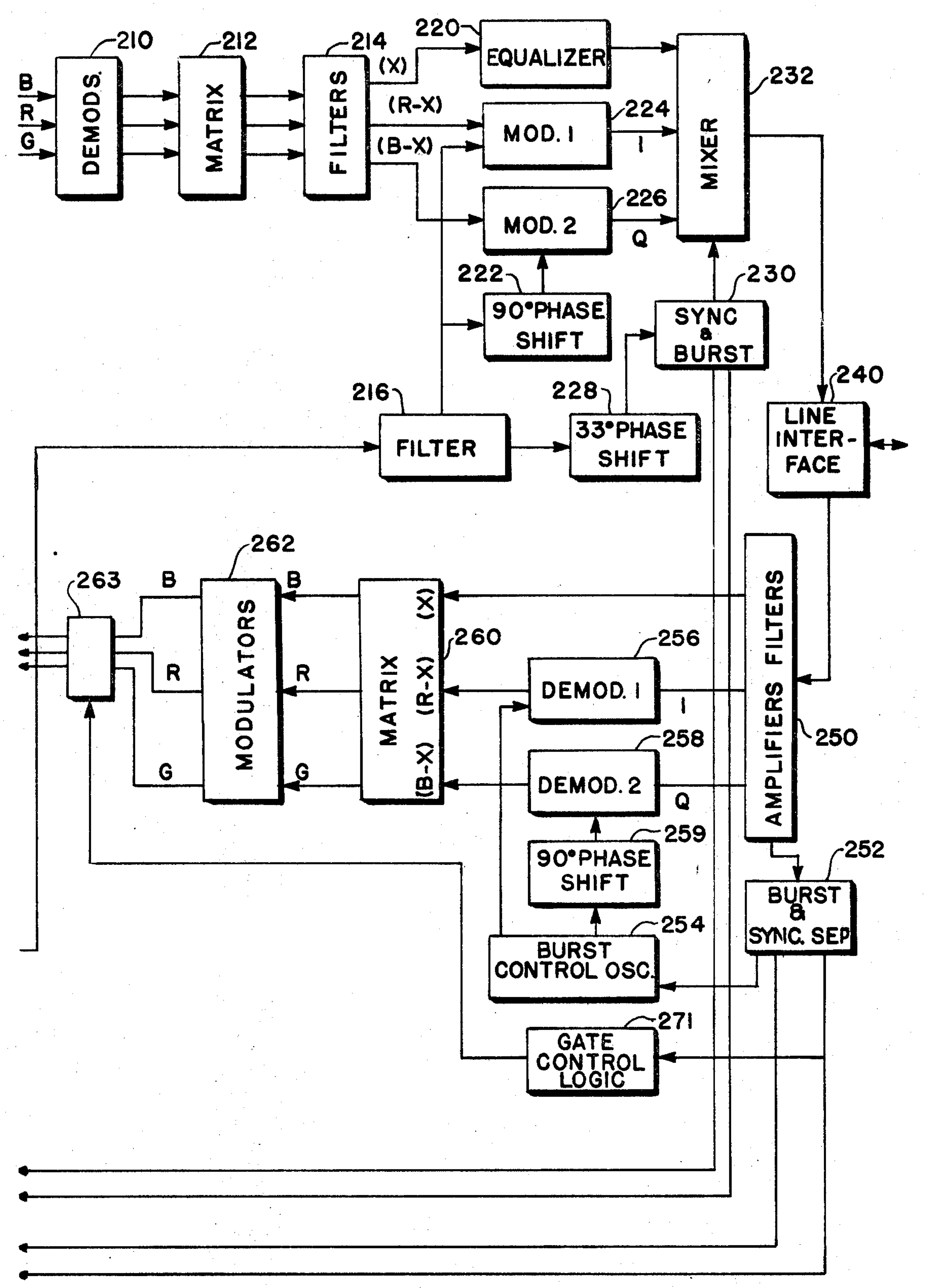
SHEET 3

3,524,010
COMPATIBLE COLOR PHOTOPHONE
John F. Brinster, 271 Mercer St., Princeton, N.J. 08540
Filed June 13, 1966, Ser. No. 557,282
Int. Cl. H04n *1/46*
U.S. Cl. 178—5.2 10 Claims

ABSTRACT OF THE DISCLOSURE

A photophone set is disclosed which extends the principles of the inventor's companion application Ser. No. 526,765 to provide for the transmission and display of color pictures ancillary to a telephone conversation. The system employs a chrominance signal interspersed between side bands of a luminance signal for picture transmission at a low frame rate over restricted-band-width telephone lines and compatible with monochrome photophone, but employs frame-sequential methods for picture recording and playback. A drum memory is used to provide a high frame rate for flicker-free viewing when operated at a high speed, and a low frame rate for transmission when operated at a selected much lower speed.

This invention relates to telephony and more particularly to methods and apparatus for transmitting a "still" picture of the telephone user ancillary to his conversation. In a copending patent application Ser. No. 526,765 filed Feb. 11, 1966. I have disclosed a method and apparatus for transmitting still pictures over a telephone line. This apparatus has been termed "Photophone," as frequently referenced herein. The present invention relates to improvements in the methods and apparatus therein disclosed to permit a transmission and reception of either color or black and white signals over a telephone line using a picturephone instrument of the general class described in the above-mentioned application. Particularly the present invention achieves the desired result by combining certain features of frame-sequential color television, magnetic recording, and compatible color television. Each of these features by itself is a well known and thoroughly proven part of the electronic art; moreover the recording of the compatible color television signals on magnetic tape is well known. A feature of the present invention is the use of magnetic drum storage as the mechanism by which the frequency spectrum required for a picture signal is compressed to fit the relatively narrow confines of a common telephone channel.

In the early development of color television it was demonstrated that the frame-sequential, color-disc system produced pictures of high quality with a simple receiver; but the frame-sequential color-disc system was found to be unsuitable for commercial television for two primary reasons. The first of these was the requirement for a mechanical drive for the disc, the second was incompatibility with existing monochrome television transmission. In the present invention both of these disadvantages are turned to advantages. It is also a disadvantage of magnetic-drum (or disc) storage systems that they too require the high speed motor and precision machine parts. In the present invention this burden is shared by both the recording drum and the color disc portions of the system thereby, in effect, cutting in half the cost which these features ordinarily individually impose upon a system. The present system moreover makes double use of the drum storage in that it is used to reformat the television signal from the frame sequential format used for pickup and display into the compatible parallel format for transmission over the telephone line, in addition to its function in band-width compression.

It is an object of the present invention to provide a photophone system suitable for transmission of color pictures over telephone wires. It is a further object of the invention to provide a system which is both simple and inexpensive so that it may be widely used by telephone subscribers. It is still a further object of the invention that the color quality and detail of the picture should be suitable for copying by a camera attachment for permanent retention. An additional object is to permit long-term retention of pictures of either party in magnetically recorded form by means of one or more selectable recording channels where desired. Other objects of the invention will in part be obvious and will in part appear hereinafter.

A feature by which the above objects are achieved is the use of a color-disc frame-sequential pick-up and tricolor tube display. (Another form of the invention employs the same disc for color display with a standard cathode ray tube.) A second feature of the invention is the use of a common, mechanically-interlocked, drive system for both the color disc and a magnetic-drum intermediate storage medium. A further feature of the invention is the storage on parallel tracks of the magnetic drum, of synchronizing signals, color subcarrier, and the separate color components of transmitted and received pictures.

The invention accordingly comprises several steps and the relation of one or more of such steps with respect to each of the others, and the apparatus embodying features of construction, combination of elements and arrangement of parts which are adapted to effect such steps, all as exemplified in the following detailed disclosure, and the scope of the invention will be indicated in the claims.

For a fuller understanding of the nature and objects of the invention reference should be had to the following detailed description taken in connection with the accompanying drawing.

The annexed drawing is a schematic diagram in three sheets showing the apparatus of the invention, of which sheet one represents predominantly the camera and picture tube portions; sheet two represents the drum memory portion; and sheet three represents the modulation and transmission portions of the circuitry of a subscriber set. The first two sheets contain applicable programming functions for the apparatus, the main programming being shown on sheet two.

The figure shows the preferred embodiment for Photophone subscriber set to transmit and receive images either monochrome or in color. The concept of Photophone is described in some detail together with a specific example of equipment programming in my above mentioned copending patent application. The present invention relates to certain novel features and improvements by which the concepts therein disclosed may be extended to color equipment. The preferred embodiment will be described hereinafter by reference to its operation in several modes corresponding to the positions of a master program switch 100. This switch has six positions and nine poles designated A through I in the figure. Both transmitting and receiving modes for just one set are described, which is a departure from the description in the above-mentioned application wherein were described two inter-communicating sets and the detailed operation of one form of programmer in such a relationship. The subscriber set as shown in the figure comprises the following elements: the nine-pole six-position switch 100 through which the various operations of the set are controlled; a television type camera tube such as a vidicon, 102, a scanning disc 104, a high speed drive motor 106 connected to and driving a magnetic storage drum 108 and also driving the color disc 104, a video modulator 110, color gates 112, 114, 116 for gating respectively green, red and blue component signals, a three-color display (which could be a tri gun type color kinescope) 118 a sweep generator 120 for the vidicon, and a sweep generator 122, with demodulation and amplification circuitry 124 for color display, color correction apparatus 126 for local color display, control logic under control of the switch 100 for controlling record gates 132 and playback gates 134.

The magnetic drum 108 has a number of storage tracks. There is a local group of tracks 140, 142 and 144 and heads 150, 152 and 154 respectively for recording respectively the blue, red and green components of the picture to be transmitted, and also a remote group of tracks 160, 162, and 164 having heads 170, 172 and 174 respectively for respectively recording the blue, red and green components of the picture being received. There are two tracks 180 and 182 for recording the synchronizing signals from the picture being received and three tracks 190, 192 and 194 with heads 195, 197 and 199 for recording respectively the local line sync, local frame sync, and color sub-carrier frequency. (These signals may be permanently fixed on the disc or drum.) Other auxiliary tracks may be added for multiple photo storage.

Picture signals are recorded through the means shown from the local camera tube and played back through the local display with the drum operating at a high speed mode. For receiving signals from the remote transmitter and for read-out of the locally recorded signals for transmission to the remote transmitter the drum is operated at a lower speed by a low-speed drive motor 200 connected through an electric clutch 202 to the drum. The low speed motor may be running at all times when the equipment is turned on. The system of transmission of the picture over the telephone line employs two basic well-known techniques to reduce the band width from that involved in the recording process. This may be considerably less than the 4½ megacycles required for television broadcast because the subject is essentially still but nonetheless is very much greater than the 2000 cycles per second, more or less, available on standard telephone lines. The important factor is the reduced drum speed whereby all frequencies are reduced proportionately, requiring transmission times in the general range of ten to thirty seconds for a single image frame of reasonable quality. The second feature is the use of a compatible color scheme similar to the compatible color system of commercial television wherein the color information is transmitted as the side bands of a phase-modulated subcarrier which sidebands are fitted between the higher frequency components of the picture signals which cluster around harmonics of the line scan frequency. For transmission of a signal from the apparatus to a similar remote set, color components are recreated from the drum-stored signals by demodulators 210, and by means of a color matrix 212, wherein the proportions of the color signals are adjusted. For this compatible color system, the original three primary color signals blue, (B), red (R), and green (G), are added together to form a weighted "luminance" signal which is psychologically acceptable for monochrome reproduction of the scene. This signal, indicated by X contains the mixed highs. It is a luminance signal similar to the luminance signal designated Y in color television. The primary color signals, by linear combination are resolved into two other signals (R–X) and (B–X) representing generally orthogonal axes on the chromaticity diagram. These signals, modulating in-phase and quadrature components of a color subcarrier convey the hue and saturation of the color. Filters 214 produce a clean mixed-high luminance X signal and the (B–X) and (R–X) chrominance components. Other circuits used in this portion of the apparatus are a filter, 216 for selecting and smoothing the recorded color subcarrier, an equalizer 220 for the mixed-high signal, a 90-degree phase-shifter 222, an in-phase modulator 224 and a quadrature modulator 226 for generating the phase-modulated chrominance signal. A 33 degree phase shifter 228 and a synchronizing and burst signal circuit 230 control the development of a suitable composite signal in mixer 232 for the purpose of transmission. The color picture signal is finally adapted to the telephone lines by line interface apparatus 240. This may be in a form similar to analog telephone data sets used for facsimile which may be direct or acoustically coupled.

In the receiving mode an incoming signal is received at the line interface equipment 240 and in amplifiers and associated filters, 250 broken down into in-phase and quadrature components of the chrominance signal, the luminance signal, synchronizing signals, and the color burst. The separator 252 separates the synchronizing signals which are then recorded and includes circuitry which periodically locks the phase of oscillator 254 to the color burst. For regeneration of chrominance components there is provided modulation by the in-phase modulator 256, the quadrature modulator 258 and the phase shifter 259. A reverse matrix 260 to convert to the red, green and blue color components, and recording modulators 262 complete the illustrated apparatus. The period of recording of the received signal may be controlled by gate 263 and its control logic 271 operated by the frame sync signal. Modulators 110, and 262 are shown which change color signals into a form more appropriate for drum recording; and demodulators 124, and 210 are shown which reconvert the recorded form of signal into normal base-band video signals. The frequency range of video signals typically cover five to six decades. It is technically difficult to sustain linearity and a high signal-to-noise ratio over such a range. Accordingly it is common practice to modulate such a signal onto a carrier so that the ratio of maximum to minimum frequency is reduced, although maximum frequency and total bandwidth may be increased. Narrow-band FM is a common choice, and is preferred. The modulators and demodulators are selected to be compatible with the recording medium as known in the recording art. The particular choice of modulators is no part of the present invention.

The equipment is OFF in the first position of the switch 100.

In the second position of the switch several events occur. Firstly the high speed motor 106 is activated to drive the recording drum 108 at a sufficiently high rate to allow high-frequency recording of the event of one picture frame (3 rasters). The rotating system may be made with low inertia for rapid speed stabilization. During the start-up period while the motor is reaching steady speed, the iris opening and gain levels of the vidicon and picture amplifier 102 may be set. The vidicon system has automatic light control over a wide range (a common technique in closed circuit TV systems). Thirdly, the local group heads 150, 152 and 154 of the drum system are connected to the red, green and blue outputs of the vidicon pick-up system. Fourthly, the gate logic 112, 114, 116, 130 and 132 is actuated to limit recording durations for each color to only one raster. When the wiper of pole A makes contact on its second position A–2 the gate control logic 130 is set. When the logic receives an impulse from the color disc pickup 264 (one impulse per rotation of the color disc 104), this opens the gates 132 connecting the vidicon system to the recording heads 150, 152 and 154. The reoccurrence of the color disc pulse on the second turn of the disc closes the gate 132 thereby allowing only one rotation of the disc for recording purposes. During this rotation however three sequential records are actually made. Three pickups 266, 268 and 270 are shown on the opposite side of the color disc from pickup 264. These engage contact sectors spaced so that the three head gates 112, 114, and 116 are opened at times corresponding to the passage of the appropriate color filter over the face of the vidicon 102. Each of the three sequential rasters of the vidicon is initiated by a local frame pulse permanently recorded on track 192 of the drum. Since the occurrence of this pulse is mechanically phased with the disc the raster scan is completed in each case while one of the three basic color filters is in position. Line sync pulses are also permanently fixed on track 190 of the drum for local use. In this switch position then, the three basic colors are recorded on the drum tracks 140, 142 and 144 in rapid succession. Since the person or object is relatively still by assumption, the tracks represent the color components of one exposure. It is necessary and understood that the video signals picked up by the vidicon amplifier are modulated in a manner suitable for magnetic recording. Vestigial side-band frequency modulation is preferred for this purpose as represented by the modulator 110. It is also desirable that the drum operate at a constant speed. The above-mentioned copending application describes a "photo ready" position to allow the motor to bring the drum up to speed. Although not shown in the figure, it is possible, and may be desirable, to control the motor drum speed by closed-loop servo techniques as is well known, using for a reference the permanently recorded signals on track 195 and 197.

In the third position of the switch 100 the apparatus plays back and displays the portrait just recorded. Playback occurs at the same (or at least a high) drum speed as for the second-position recording. The heads 150, 152, 154 are connected in this position to the display system 118 via the correcting network 126 and the demodulators 124. The network 126 is employed to adjust the reproduced colors. The same or properly related sync signals are employed to provide the required display raster.

In the fourth position the apparatus transmits to a similar subscriber set at a remote location. The details of the working relationships of two equipments in communication in this manner are described in the above-mentioned copending application. In this position the high-speed motor drive is turned off and the electric clutch 202 is actuated to engage the low speed drive 200 which may also be servo controlled. Again the gate control logic 130 is set by a frame pulse, in this case from the frame sync head 147 rather than from the color disc. The four gates 134 are opened until the next occurrence of the frame pulse, signals being read out simultaneously from all three color tracks.

Transmission at the rate compatible with the band width of the line thereafter takes place. The system is similar to the well known color TV system making use of the principle of mixed highs. In brief, the color signal components red, blue and green are demodulated as they are read out of the recorder. They are resolved into three other components called X (for mixed high luminance signal) (R–X) for red-minus luminous, and (B–X) (for blue minus luminance components in the matrix 212). In practice, as in television, the (R–X) part may be reduced in band width to approximately ⅓ of that for X and the (B–X) video is reduced to about ⅙ of the X component bandwidth. This takes advantage of the known relationship between color and perceptible detail. The resultant luminance (X) signal may be employed as a monochrome signal. The makeup in percentage of each of the three colors corresponds to the same percentages used in dividing a monochrome signal at the receiver to send to the three gun color tube to produce monochrome displays. It is well known that the TV-type video (monochrome) signal spectrum has considerable unused space. The color sub-carrier has a frequency which is an odd multiple of the line scanning frequency, selected so that its side bands fit nicely in the spectrum without any additional required band width. The necessary frequency relationships are conveniently maintained by using the reference permanently recorded on the drum in the track 199 rather than an oscillator source as used in television. Since both the line frequency and the color subcarrier frequency are permanently fixed to the drum, in the required frequency relationship they are necessarily synchronized, and readily phased.

The modulators 224 and 226 respectively modulate two phases this reference signal to produce an inphase signal I and a quadrature signal Q which together provide a so-called color or "chroma" signal. An appropriately shifted reference phase of the sub-carrier is transmitted over the telephone line by means of a "color burst" during the normal blanking time, as in TV color systems. This frequency is set into a local oscillator and thereafter phase-locked; thus, since the two components represent perpendicular axes on the well-known chromaticity diagram (shifted 33 degrees from the main axis for convenience) the hue information is determined at the receiver by the phase relationship between the chroma signal and the reference burst. Color saturation is determined by the amplitude of the chroma signal. Brightness is determined as in monochrome by the X signal. Appropriate insertion of sync signals is also provided.

In the fifth position the set may receive a signal such as that just desribed. Filters 250, demodulators 256, 258 and a matrix 260 perform reverse operations at the receiving end relative to those described above. The burst phase is detected in well known fashion and used to produce the correct color signal components. The sync signals both line and frame are separated and recorded on the drum 108 on separate tracks, 180, 182. It is possible to put these on one or more of the color tracks 160, 162, 164.

The drum is operating at low speed mode just as is the transmitting drum. Remote group tracks 160, 162 and 164 are connected to the demodulation system, by gate 263, just for the duration of the incoming transmission.

In the sixth position, the received image is displayed. The remote group tracks 160, 162 and 164 of the drum are connected to the display system 118–124. The high speed motor drive rotates the drum system in the high-speed mode for display purposes. (It should be mentioned that the phosphor of the screens of the display tube may be of the persistent type to reduce flicker at relatively low speeds without interlace.)

Contact 6 of pole A of switch 100 transfers local-remote sync switch 128 a double pole switch removing the display sweep system connection to the remote sync heads of the drum system for reception. The sync signals are thereby played back with the sequential color components.

Appropriate delay-line adjustments may be required for color equalization and registration as well known in the art and therefore not detailed here.

It will be clear that the system just described is a "compatible color system" in the same manner that the commercial color system is compatible.

Color signals from a set as described may be received in monochrome by a monochrome set as described in the above-mentioned copending application; and polychrome sets can receive and display signals from such a monochrome set.

It is clear from the above description that the basic color components may be sequentially recorded in additoin to the recording on an additional channel one complete monochrome frame. The monochrome frame may therefore be used as the luminance signal throughout the system to minimize the need for proper registration of the elements of the three colors. This form of recording as an example may utilize four rather than three positions on the color disc one position being arranged for monochrome recording.

Although this invention is described by use of the well-known standard color transmission technique used in the television art other color transmission techniques may be employed equally for the purposes intended.

It will be recognized that the above example is my way of illustration and that there are many equivalent structures by which the benefits of the invention may be enjoyed. At least three forms of color pick-up are evisioned.

In one there are three separate camera tubes and a system of dichroic mirrors for exposing each tube to a separate primary color. In another arrangement, a single camera tube is exposed through a section of the same color disk used for display to provide successive rasters in the three colors. Alternatively the scene may be illuminated by successive flashes of red yellow and blue flash tubes. There are also conceivable structures for true color camera tubes in which separate portions of the photosensitive mosaic are reserved for the separate colors which are directed to them by a lenticular lens. Such a tube would be analogous to a color picture tube.

The magnetic drum is the preferred embodiment for the required memory; but it will be recognized that the same result may be achieved with a drum in which the information is stored as electrostatic energy, or in phosphorescence, for example. Electrostatic cathode-ray memory tubes may be used. New forms of shift-registers using thin-film and microcircuit techniques are under development and in the future may prove to be economic substitutes for the drum. In these devices, minute magnetic domains each carrying one binary bit of information are established in a medium and the domain pattern is propagated, the medium remaining fixed. Ultrasonic delay lines now approach a practical storage capacity sufficient for a portrait. While wide variation in the propagation speed of a line is not possible, a combination of delay lines and shift registers may readily be arranged to deliver the same serial information at a fast or slow rate. The shift register samples the line at a high rate and delivers the information at a desired lower rate.

To describe all these various non-random access memories I use the term "cyclic serial recording means" generically.

It will be recognized that the picture signal when it is on the telephone lines may be treated as any other telephone message. It may be relayed by radio, recorded on an ordinary tape recorder, etc.

Since the line-scanning frequency and the color subcarrier are related, and frame and line rates related, all synchronizing signals may be recorded on one track if desired.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

I claim:

1. A compatible color photophone system comprising a television pickup, a scanning system for using with said pickup for producing three successive rasters of video signals representing respectively three primary colors of an image; multi channel, cyclic, serial, recording means synchronized with said scanning means to record sequentially on three separate parallel channels said three color video signals said recording means having a synchronizing means for synchronizing the recording of said three color signals and for carrying a color subcarrier for signal reformatting, means for playing back said three color video signals simultaneously and with said color subcarrier to produce a mixed-highs luminance signal and a phase-modulated chrominance signal fitted between line-scanning-frequency harmonics of said luminance signal, said luminance signal and said chrominance signal with synchronizing signals comprising a composite color video signal, and means for demodulating a composite color signal.

2. Apparatus according to claim 1 wherein said scanning means comprises a color wheel and said recording means comprises a magnetic-drum memory driven at three times the speed of said wheel.

3. Apparatus as defined by claim 1 wherein said recording means comprises a multiple-track recording drum, and multiple heads for same.

4. Apparatus as defined by claim 1 wherein said recording means comprises a magnetic recording drum having multiple heads associated therewith and wherein said scanning means comprises a color wheel mechanically synchronized to said recording drum having sweep signals generated in accordance with synchronizing pulses recorded on said drum.

5. Apparatus as defined by claim 4 in further combination with compatible signal-forming means comprising readout means for reading out said three primary color video signals from said recording drum at a reduced drum speed, demodulation means for reconstituting the three color video signals, linear means for transforming said three primary color video signals into chrominance components and a luminance signal, means for generating a color-subcarrier from said color subcarrier channel, means for modulating said color subcarrier with said chrominance components to produce a phase-modulated carrier-suppressed chrominance signal, and means for impressing both said luminance signal and said chrominance signal on a telephone circuit.

6. Apparatus as defined by claim 5 in further combination with detection means for separating a luminance signal from a chrominance signal and for separating synchronizing signals from a composite video signal, means for demodulating said chrominance signal into E–R and Y–R components, linear means for reconstituting from the demodulated signals primary video color components means for recording said video color components in parallel tracts on said magnetic drum together with said detected synchronizing signals, means for serially reading out said primary color recorded signals to modulate a kinescope, and means for rendering said image from said kinescope successively in accordance with each of said primary colors.

7. Apparatus as defined by claim 6 in further combination with switch means having connections for turning said photophone off at a first position of said switch in a second position of said switch to operate said magnetic drum in a high speed mode and at said high speed to record successive rasters in said primary color components on said drum, in a third position to connect said recorded three video components to said color kinescope means and to operate said drum in said high speed mode whereby in three successive rasters images in said three primary colors are repeatedly presented by said color kinescope, in a fourth switch position to operate said drum at a lower-speed mode and to simultaneously read out said three color components in said compatible-color format in a fifth position to receive from a remote similar set a low-speed compatible color signal to demodulate and to record said three primary video signals in parallel on said drum and in a sixth position to operate said drum at an increased rate of speed and to read out said detected and recorded received color signals.

8. Apparatus as defined by claim 1 in further combination with detection means for separating a luminance signal from a chrominance signal and for separating sychronizing signals from a composite video signal, means for demodulating said chrominance signal into B–R and Y–R components, matrix means for reconstituting from the demodulated signals primary video color components, means for recording said video color components in parallel on said cyclic recording means, means for serially reading out said primary color recorded signals to modulate a kinescope and means for rendering said image from said kinescope successively in accordance with each of said primary colors.

9. Apparatus as defined by claim 8 in further combination with switch means having connections for turning said photophone off in a first position of said switch in a second position of said switch to operate said cyclic recording means in a high cyclic rate and at said high rate to record successive rasters in said primary color component in said cyclic means and in its third position to connect said recorded three video components to said color kinescope means to operate said drum in said higher speed remote whereby in three cyclicly successive rasters images in said three primary colors are repeatedly presented by said said color kinescope, and in a fourth switch position to operate said cyclic means at a lower cyclic rate and to simultaneously read out said three color components in said compatible color format, in a fifth position to receive from a remote similar set a low speed compatible color signal to demodulate and to record said three primary video signals in parallel in said cyclic means and in a sixth position to operate said cyclic means at an increased cyclic rate and to read out said detected and recorded received color signals.

10. Apparatus as defined in claim 1 in which said scanning system includes means for producing a fourth raster successive with said three rasters representing an unfiltered (black-and-white) image, said recording means includes a fourth parallel channel for the video signals of said fourth raster, and wherein said playback means utilizes said fourth raster video signals as said luminance signal.

References Cited

UNITED STATES PATENTS

| | | | |
|---|---|---|---|
| 2,010,307 | 8/1935 | Leishman | 178—5.2 |
| 2,291,105 | 7/1942 | Rebold | 179—100.11 |
| 2,824,904 | 2/1958 | Toucon | 178—6 |
| 2,860,186 | 11/1958 | Hefele | 179—15 |
| 3,267,207 | 8/1966 | Okazaki et al. | 178—5.2 |

JOHN W. CALDWELL, Primary Examiner

J. C. MARTIN, Assistant Examiner